United States Patent [19]

Sanroma

[11] 3,867,339

[45] Feb. 18, 1975

[54] ALPHA CRYSTALLINE LATTICE POLYAMIDES CONTAINING SODIUM PHOSPHINATE AND A CALCIUM SALT

[75] Inventor: Ulises Canellas Sanroma, Richmond, Va.

[73] Assignee: The Firestone Tire & Rubber Company, Akron, Ohio

[22] Filed: July 16, 1973

[21] Appl. No.: 379,863

[52] U.S. Cl.......... 260/45.7 R, 260/18 N, 260/37 N, 260/45.7 P, 260/78 L, 260/78 R
[51] Int. Cl............................................... C08g 20/12
[58] Field of Search ........ 260/45.7 R, 18 N, 45.7 P, 260/37 N, 78 L, 78 R

[56] References Cited
UNITED STATES PATENTS

| | | | |
|---|---|---|---|
| 2,981,715 | 4/1961 | Ben | 260/18 |
| 3,009,900 | 11/1961 | Hansen | 260/18 |
| 3,214,414 | 10/1965 | Waltersperger | 260/78 |
| 3,400,087 | 9/1968 | Robb et al. | 260/18 |
| 3,634,543 | 1/1972 | Sherman | 260/78 |
| 3,755,221 | 8/1973 | Hitch | 260/18 |

*Primary Examiner*—Eugene C. Rzucidlo

[57] ABSTRACT

A stable polyamide molding resin containing a high degree of alpha crystalline lattice is produced by blending a polyamide polymer, sodium phenylphosphinate ranging from 0.01 to about 0.5% and a calcium salt ranging from 0.01 to about 0.5% by weight, both based on said polyamide.

16 Claims, No Drawings

3,867,339

ALPHA CRYSTALLINE LATTICE POLYAMIDES CONTAINING SODIUM PHOSPHINATE AND A CALCIUM SALT

BACKGROUND OF THE INVENTION

The present invention relates to crystalline polyamides which contain a high amount of alpha or monoclinic structure. More specifically, the present invention relates to an increase in the crystallization rate of melted polyamides by nucleation to yield a more stable alpha crystalline lattice.

In the molding of nylons, it is highly desirable to use articles which are easily and readily processable and which produce articles of good physical properties. Heretofore, mold releasing agents have often been added and blended with nylons. Such agents although speeding up the molding cycle and/or ejectability, have little effect on the physical properties as well as the stability of the polymers. Another manner of generally obtaining faster molding cycles has been to nucleate some of the polyamides. Although a great number of compounds have been utilized in polyamide nucleation, only mediocre improvements in properties and stability at best have been obtained.

According to one prior art reference, French Patent No. 1,545,460, Sept. 30, 1968, finely divided insoluble salts of phenylphosphinic acid has been mechanically dispersed in a polyamide in order to increase the nucleation a slight amount. In addition to the requirement of a controlled very small particle size before disbursement, the French Patent required a relatively high concentration of 1% by weight as well as high shear equipment to process the compound. A U.S. Pat. No. 2,981,715, Apr. 25, 1961, directed to the production of yellowing inhibited polyamides utilized antioxidants which did not induce spherulitic nucleation in the polymer. These antioxidants were largely sodium phenylphosphinates which only had a very slight nucleation effect in crystallizable polyamides. Another patent directed to the stablizing of polyamides is U.S. Pat. No. 3,009,900, Nov. 21, 1961, which relates to a nucleating agents such as sodium phenylphosphinate and zinc stearate to improve the processability of nylon copolymer molding compound. Although polycaprolaetam with these additives can be described as nucleated, it cannot be classified as an alpha nylon by generally accepted standards in view of x-ray diffractograms due to a large amount of gamma structure. Moreover, it is doubtful that non-stereoregular amide copolymers of the types described in U.S. Pat. No. 3,009,900, can be significantly or highly nucleated and said Patent does not set forth any evidence of such a degree of nucleation. In summary, these patents have only achieved a limited amount of crystallization in forming a stable alpha crystalline lattice polyamide.

SUMMARY OF THE INVENTION

It is, therefore, an object of the present invention to provide a stablized alpha crystalline lattice polyamide compound.

It is another object of the present invention to provide a stable alpha crystalline lattice polyamide, as above, by increasing the crystallization rate of the melted polyamides by nucleation.

It is a further object of the present invention to provide a stable alpha crystalline lattice polyamide, as above, which permits faster molding cycles and ejectability.

It is a still further object of the present invention to provide a stable alpha crystalline lattice polyamide, as above, which has increased tensile strength, a high flexural modulus, and a gain in high heat distortion temperature.

It is yet another object of the present invention to provide a stable alpha crystalline lattice polyamide, as above, which utilizes inexpensive low sheer compounding equipment.

In general, a stable alpha crystalline lattice polyamide according to the present invention is produced by adding from 0.01 to about 0.5 parts of sodium phenylphosphinate and from 0.01 to about 0.5 parts of a calcium salt by weight to 100 parts of the polyamide polymer.

In general, the preferred embodiments of the present invention is described in detail without attempting to discuss all of the various modifications in which the invention might be embodied; the invention being measured by the appended claims and not by the details of the specification.

DESCRIPTION OF THE PREFERRED EMBODIMENTS

An alpha or monoclinic crystalline lattice polyamide compound for use such as a polyamide molding resin according to the concepts of the present invention can be prepared by the addition of two groups of compounds to polyamide polymers which in combination promote nucleation. Generally, any conventional polyamide (nylon) polymers can be utilized so long as they are produced from a polymerization of lactams or internal amides having from 3 to about 15 carbon atoms such as polycaprolactam, nylon 6. Polycaprolactam is favored.

One of the compound groups which help to nucleate the polyamides are the metal arylphosphinates such as sodium phenylphosphinate. The range of these compounds by weight based upon the polyamide polymer is generally from 0.01 to about 0.5%. Generally an amount of from 0.05 to about 0.3% is preferred.

The other compound group can generally be classified as calcium salts which include inorganic salts such as calcium iodide, calcium chloride, calcium bromide, calcium aluminate, calcium carbonate, the calcium phosphates, and calcium sulfate as well as the organo metallic salts such as calcium acetate, calcium butyrate, calcium laurate, calcium proprionate and calcium stearate. Preferred salts include calcium iodide, calcium chloride and calcium stearate. A desirable amount by weight of calcium salts based upon the polyamide ranges from 0.01 to about 0.5% with an amount of 0.05 to about 0.3% being preferred.

It is critical to the present invention to use a compound from each additive group in order to increase the crystallization rates of melted polyamides by nucleation to yield a high amount of the more stable alpha crystalline lattice. If only a calcium salt compound is used, it has been found to have virtually no affect upon the nucleation of the polyamides although a specific salt, calcium iodide does act as an antioxidant and can be added prior to polymerization. Similarly, the use of sodium phenylphosphinate has been found by x-ray diffraction to have a very slight increase in the formation of alpha crystalline lattice structure. Thus, the result produced by the combination of the calcium salt and sodium phenylphosphinate in producing a highly crystalline polyamide containing the very high number of alpha crystalline lattices was totally unexpected and unobvious. The exact reason for the many-fold increase in the production of the alpha spherulites is unknown but it is thought that the calcium salts greatly enhance the nucleating effect of sodium phenylphosphinate.

Compounds produced according to the present invention when subjected to x-ray diffraction using 1.5418 A radiation, have revealed that a single very high peak of between four and five units is obtained at a diffraction angle of approximately 23°(2θ). As well known to one skilled in the art of x-ray diffraction, such a value indicates a nucleated substance of high crystalline monoclinic (alpha) structure which is stable whereas a peak at an angle of 21° indicates a gamma structure which is known to be unstable in molding processes and is non-nucleated. As a result of the nucleated alpha type structure, the polyamides of the present invention and particularly the polycaprolactams have faster molding cycles as well as ejection rates and have improved physical properties such as tensile strength, high flexural modulus and higher heat deformation temperatures as set forth in the data below. When only sodium phenylphosphinate was added, a very slight increase in these properties occurred whereas when only a calcium salt was added, no noticeable effect in these properties was observed, Table 3 below.

The method of incorporation of the compounds into the polyamide mixture is not critical. In general, the additive compound is selected from each group and may be dry blended with or dispersed in a polyamide polymer before being compounded by a conventional extruder such as as a ZSK53 Werner and Pfliederer Corporation double extruder. Such an extruder has a 120mm kneading zone which provides a specific energy input of approximately 0.1 kwh per kg of a molding resin compound containing polycaprolactam, 0.1% sodium phenylphosphinate and 0.1% calcium stearate. Such specific energy input is low for a polycaprolactam and represents another advantage of the present invention in that low sheer equipment can be used in compounding polyamides for use in particularly the injection molding field although the compound polymer can be used in other molding fields as well. The additives can also be compounded by directly molding the dry blend material in a reciprocating screw injected molding machine. Another method of producing the polyamide molding resin compound involves the incorporation of the additive from each group during the polymerization of the polyamide.

Molding specimens upon which physical tests were conducted and which were subjected to x-ray diffraction were obtained from a Newberry 75-RSE injection molding machine which had a mold design in accordance with ASTM D-647-68 specifications. The molding condition for the preparation of such specimens are set forth in Table 1.

TABLE 1

MOLDING CONDITIONS

NEWBERRY 75-RS3 MOLDING MACHINE

| | |
|---|---|
| Mold Temperature, °F Fluid | −155 |
| Surface (pyrometer) | −145 |
| Barrel Temperature, °F | −480 |

TABLE 1-Continued

MOLDING CONDITIONS

NEWBERRY 75-RS3 MOLDING MACHINE

| | |
|---|---|
| Screw Speed, RPM | −100 |
| Injection Pressure, PSI | −750 |
| Back Pressure, PSI | −100 |
| Injection Time, Seconds | −20 |
| Overall Time, Seconds | −45 |
| Parts Molded | — T-Bars, ⅛″ and ¼″ bars |
| Cooling Rate | — Cooled in air at 23°C |
| Other | — Kept in desicator 16 to 24 hours |

The molding characteristics of a molding resin compound containing a polycaprolactam, 0.1% of sodium phenylphosphinate and 0.1% of calcium stearate are set forth in Table 2.

TABLE II

MOLDING CHARACTERISTICS*

| | |
|---|---|
| Minimum Molding Cycle, Seconds | |
| Injection Time | 6 |
| Released from mold cavity | 15 |
| Released from mold and sprue** | 25 |
| Minimum Injection Pressure to Fill Mold, psi | |
| Hydraulic Line | 150 |
| Polymer | 2,000 |
| Maximum Injection Pressure Without Flashing, psi | |
| Hydraulic Line | 850 |
| Polymer | 12,000 |

*Non-specified conditions as in Table 1
**Sprue section has deficient cooling

The nucleation effect of the formation of alpha crystalline lattices within the polycaprolactam polymer concerning the tensile strength and the percentage of elongation for various amount of sodium phenylphosphinate and calcium stearate are set forth in Table III.

TABLE III

NUCLEATION EFFECT

POLYCAPROLACTAM AND SODIUM PHENYLPHOSPHINATE-CALCIUM STEARATE

| Concentration, % | | Tensile Strength, psi | Elongation, % | |
|---|---|---|---|---|
| Sodium Phenyl Phosphinate | Calcium Stearate | Annealed* | As Molded | Annealed* |
| 0 | 0 | 10,400 | | >50 |
| 0 | 0.30 | 10,900 | | >50 |
| 0.05 | 0.30 | 12,360 | | 5.5–50 |
| 0.10 | 0.30 | 12,590 | | 6.5–56 |
| 0.15 | 0.30 | 12,870 | | 6.5–26 |
| 0.20 | 0.30 | 12,950 | | 15 |
| 0.10 | 0 | 11,290 | 10,520 | >50 |
| 0.10 | 0.075 | 12,820 | | 6–14 |
| 0.10 | 0.15 | 12,670 | 12,200 | 8–15 |
| 0.10 | 0.20 | 12,590 | | 6.5–56 |

*Bone dry, annealed for six hours at 75°C, 0.2 in/minute crosshead speed.

Additional data concerning the physical properties of a polycaprolactam molding resin containing 0.1% of sodium phenylphosphinate and calcium stearate when produced according to the molding conditions and molding characteristics set forth in Tables I and II are set forth below in Tables IV and V.

TABLE IV

POLYCAPROLACTAM, 0.1% SODIUM PHENYLPHOSPHINATE AND CALCIUM STEARATE

| Property (Bone Dry) | RESULT |
|---|---|
| Tensile Strength, psi Average | 13,264 |
| Elongation, % Average | 8.0 |
| Tensile Modulus, psi Average | 233,455 |
| Flex strength, psi Average | 20,090 |
| Flex Modulus, psi Average | 489,366 |
| Specific Gravity Average | 1.14 |
| Izod Impact Strength, ft.lbs./inch Average | 0.86 |
| Deflection Temperature, °F | |
| 66 psi Average | 356 |
| 264 psi Average | 151 |
| Melting Point, °F Average | 432.5 |
| Mold Shrinkage (24 hours), in/in Average | 0.008 |
| Water Absorption (24 hours), % Average | 2.0 |
| Tensile Strength Retention, % | |
| at 121°C (290°F) for 10 days | 100 |
| at 149°C (300°F) for 25 hours | 96 |

Photomicrographs show that, upon molding, such compounds develop uniformly sized and densely packed spherulites. X-ray diffraction as noted above, show that the crystalline phase was highly monoclinic or alpha crystalline lattice.

Additional polycaprolactam injection molding resins were prepared by adding 0.1% of sodium phenylphosphinate and calcium iodide as well as 0.1% sodium phenylphosphinate and calcium chlorides. The x-ray diffraction testing revealed that a curve very similar to the polycaprolactam molding resin wherein the calcium salt was calcium stearate. That is, a single high peak of about four units was obtained at a 2θ angle of approximately 23°. Thus, such experimental data generally indicates that a calcium salt, being inorganic or organometallic, may be used in association with sodium phenylphosphinates to achieve nucleation and alpha crystallinity of polylactam molding resins.

As apparent to one skilled in the art, modifications of the amounts of additives as well as the type of polyamide can be made without departing the spirit of the invention herein disclosed and claimed, the scope of the invention being limited solely by the scope of the attached claims.

What is claimed is:

1. A nylon resin comprising a nucleated alpha crystalline lattice polylactam resin formed by adding and blending sodium phenylphosphinate and a calcium salt with a polylactam polymer having from 3 to about 15

TABLE V

POLYCAPROLACTAM, 0.1% SODIUM PHENYLPHOSPHINATE & CALCIUM STEARATE*

| Property | Sample Thickness Inches | ASTM Test No. | Condition | Crosshead inches 0.2 | Speed minute 2.0 |
|---|---|---|---|---|---|
| Tensile Strength, psi Average | ⅛ | D-638-68 | Dry | 11,940 | 12,550 |
| Tensile Strength, psi Average | ⅛ | D-638-68 | 48 hrs, 23°C 50% R.H. | | 11,700 |
| Elongation Average | ⅛ | D-638-68 | Dry | 50 | 49 |
| Elongation, % Average | ⅛ | D-638-68 | 48 hrs, 23°C 50% R.H. | | 47 |
| Flex Modulus, psi Average | ⅛ | D-790-60 | Dry | | 423,500 |
| Flex Yield Strength, psi Average | ⅛ | D-790-60 | Dry | | 16,000 |
| Izod Impact Strength, ft lb/in Average | ⅛ | D-236-56 | Dry | | 0.55 |
| Izod Impact Strength, ft lb/in Average | ¼ | D-236-56 | Dry | | 0.70 |
| Izod Impact Strength, ft lb/in Average | ⅛ | D-236-56 | 48 hrs, 23°C 50% R.H. | | 0.90 |
| Deflection Temperature, °F 264 psi Average | ⅛ | D-648-56 | Dry | | 154 |
| Deflection Temperature, °F 264 psi Average | ¼ | D-648-56 | Dry | | 158 | carbon atoms in the repeating unit, said sodium phenylphosphinate ranging from 0.01 to about 0.5% by weight based on said polylactam, said calcium salt ranging from 0.01 to about 0.5% by weight based on said polylactam and selected from the group consisting of calcium iodide, calcium chloride and calcium stearate, and melting and crystallizing said blended polylactam polymer.

2. A nucleated alpha crystalline lattice nylon resin as in claim 1, wherein said polylactam polymer is polycaprolactam.

3. A nucleated alpha crystalline lattice nylon resin as in claim 2, wherein the amount of sodium phenylphosphinate ranges from 0.05 to about 0.3%.

4. A nucleated alpha crystalline lattice nylon resin as in claim 2 wherein said calcium salt is calcium stearate.

5. A nucleated alpha crystalline lattice nylon resin as in claim 2, wherein the amount of said calcium salt ranges from 0.05 to about 0.3% by weight.

6. A nucleated alpha crystalline lattice nylon resin as in claim 2 wherein the amount of sodium phenylphosphinate is 0.1% by weight.

7. A nucleated alpha crystalline lattice nylon resin as in claim 2 wherein the amount of calcium salt is about 0.1% by weight.

8. A nucleated alpha crystalline lattice nylon resin as in claim 2, wherein the amount of said sodium phenylphosphinate ranges from 0.05 to about 0.3% and the amount of said calcium salt ranges from 0.05 to about 0.3%.

9. A nylon resin comprising a nucleated alpha crystalline lattice polylactam resin formed by incorporating sodium phenylphosphinate and a calcium salt during the polymerization of a lactam having from 3 to about 15 carbon atoms, and polymerizing said lactam to produce said nucleated polylactam resin, said sodium phenylphosphinate ranging from 0.01 to about 0.5% by weight based on said polylactam, and said calcium salt ranging from 0.01 to about 0.5% by weight based on said polylactam and selected from the group consisting of calcium iodide, calcium chloride and calcium stearate.

10. A nylon resin as in claim 9, wherein said polylactam polymer is polycaprolactam.

11. A nylon resin as in claim 10, wherein the amount of sodium phenylphosphinate ranges from 0.05 to about 0.3%.

12. A nylon resin as in claim 10, wherein said calcium salt is calcium stearate.

13. A nylon resin as in claim 10, wherein the amount of said calcium salt ranges from 0.05 to about 0.3% by weight.

14. A nylon resin as in claim 10, wherein the amount of sodium phenylphosphinate is about 0.1% by weight.

15. A nylon resin as in claim 10, wherein the amount of calcium salt is about 0.1% by weight.

16. A nylon resin as in claim 9, wherein the amount of said sodium phenylphosphinate ranges from 0.05 to about 0.3% and the amount of said calcium salt ranges from 0.05 to about 0.3%.

* * * * *

UNITED STATES PATENT OFFICE
CERTIFICATE OF CORRECTION

Patent No. 3,867,339    Dated February 18, 1975

Inventor(s) Ulises Canellas Sanroma

It is certified that error appears in the above-identified patent and that said Letters Patent are hereby corrected as shown below:

The title of the patent on the first page reads "ALPHA CRYSTALLINE LATTICE POLYAMIDES CONTAINING SODIUM PHOSPHINATE AND A CALCIUM SALT". The title should read -- ALPHA CRYSTALLINE LATTICE POLYAMIDES CONTAINING SODIUM PHENYLPHOSPHINATE AND A CALCIUM SALT --.

In column 1, the title should be corrected to read as outlined above.

Column 7, Claim 6, line 22 "is 0.1%" should be -- is about 0.1% --.

Signed and Sealed this thirtieth Day of September 1975

[SEAL]

Attest:

RUTH C. MASON
Attesting Officer

C. MARSHALL DANN
Commissioner of Patents and Trademarks